United States Patent
Lindteigen et al.

(10) Patent No.: US 9,852,300 B2
(45) Date of Patent: Dec. 26, 2017

(54) SECURE AUDIT LOGGING

(71) Applicants: Ty Lindteigen, Chandler, AZ (US); Anthony Payne, Chandler, AZ (US)

(72) Inventors: Ty Lindteigen, Chandler, AZ (US); Anthony Payne, Chandler, AZ (US)

(73) Assignee: SAIFE, Inc. AZ (US)

( * ) Notice: Subject to any disclaimer, the term of this patent is extended or adjusted under 35 U.S.C. 154(b) by 34 days.

(21) Appl. No.: 14/864,863

(22) Filed: Sep. 25, 2015

(65) Prior Publication Data
US 2017/0091463 A1    Mar. 30, 2017

(51) Int. Cl.
G06F 21/60    (2013.01)
H04L 9/08    (2006.01)

(52) U.S. Cl.
CPC .......... *G06F 21/602* (2013.01); *H04L 9/0816* (2013.01); *H04L 2209/24* (2013.01)

(58) Field of Classification Search
CPC .. H04L 9/0816; H04L 2209/24; G06F 21/602
See application file for complete search history.

(56) References Cited

U.S. PATENT DOCUMENTS

| | | | | |
|---|---|---|---|---|
| 8,751,800 | B1* | 6/2014 | Dorwin | G06F 21/6209 380/277 |
| 9,405,920 | B1* | 8/2016 | Roth | G06F 21/602 |
| 9,521,123 | B2* | 12/2016 | Jueneman | G06F 21/32 |
| 2008/0263363 | A1* | 10/2008 | Jueneman | G06F 21/32 713/184 |
| 2012/0005542 | A1* | 1/2012 | Petersen | G06F 11/0709 714/48 |
| 2012/0102334 | A1* | 4/2012 | O'Loughlin | G06F 21/57 713/189 |
| 2012/0137137 | A1* | 5/2012 | Brickell | H04L 9/0816 713/182 |
| 2014/0016776 | A1* | 1/2014 | Van Foreest | G06F 21/72 380/46 |

* cited by examiner

*Primary Examiner* — Kambiz Zand
*Assistant Examiner* — Arezoo Sherkat

(57) ABSTRACT

The invention includes systems and methods to asymmetrically encrypt audit logs, store a limited period of the encrypted audit logs, periodically send the encrypted audit logs to a central location for storage and further process in order to provide tamper-proof evidence of an activity. The system comprises a secure audit client enabled to perform various activities. A secure audit manager logs such activities in an audit log for uploading to a secure audit server. The secure audit server receives the audit logs from the secure audit manager. Finally a secure audit log consumer requests audit log data from the secure audit log manager to review the secure audit log.

14 Claims, 3 Drawing Sheets

SECURE AUDIT LOGGING

FIELD OF THE INVENTION

This invention relates generally to the field of data security, and particularly methods, apparatuses, and systems for securely storing, auditing, and logging data.

BACKGROUND OF THE INVENTION

Many electronic systems suffer from unauthorized access by fraud. Such systems typically include security systems that detect the attempts to gain unauthorized access by fraud. Such security systems typically detect fraud after the fact and gather evidence of the fraud for use in attempting to determine the parties that committed the fraud. For example, a computer may be used to log activity for a private network. The logged activity may include information about the parties accessing the network, such as the parties' IP address, location, and other identifying information, as well as the time and duration of the activity. The computer would then keep track of the private network's activity and detect an attempt to hack the network, or an actual hack into the network. The computer would then be able to use the log to perform a forensic root cause analysis.

Such evidence of fraud is typically stored as a log file in the electronic system subject to the fraud. Often times the log file can be altered by the attackers as the attackers attempt to cover their tracks. It would be advantageous for the log to be stored in an undeletable and unalterable state and/or location, such that the hacker would not be able to delete or alter the information stored in the log.

This invention provides a novel solution for a secure audit logging system, apparatus, and processes for creating an unalterable log, thus enabling the victims of a fraudulent attack to determine when their system has been hacked and to securely access the unaltered log for forensic root cause analysis.

BRIEF SUMMARY OF THE INVENTION

One embodiment of the invention is a method for generating secure audit logs for performing a forensic root cause analysis. First an event occurs. Next, a first device records the event as a data log. Next, the first device encrypts the data log in a manner such that the encrypted data log can only be unencrypted with a first encryption key, thus protecting the chain of title for the data log. Next the first device stores the encrypted data log and the first encryption key in the memory of the first device. Next the first device transmits the encrypted data log to a remote second device. Next the second device decrypts the encrypted data log with a compatible encryption key to produce the unencrypted data log. Next the first device purges the encrypted data file and first encryption key from the local memory of the first device. Finally the first device creates a second encryption key to encrypt a second set of encrypted data logs.

Another embodiment of the invention is a system enabled to asymmetrically encrypt audit logs, store a limited period of the encrypted audit logs, periodically sending the encrypted audit logs to a central location for storage and further processing in order to provide tamper-proof evidence of activity. First the embodiment of the system comprises a secure audit client enabled to perform various activities. Next a secure audit manager logs such activities in an audit log for uploading to a secure audit server. Next the secure audit server receives the audit logs from the secure audit manager. Finally a secure audit log consumer requests audit log data from the secure audit log manager to review the secure audit log.

BRIEF DESCRIPTION OF THE DRAWINGS

Features and advantages of the claimed subject matter will be apparent from the following detailed description of embodiments consistent therewith, which description should be considered with reference to the accompanying drawings, wherein:

DETAILED DESCRIPTION OF THE INVENTION

The following describes the details of the invention. Although the following description will proceed with reference being made to illustrative embodiments, many alternatives, modifications, and variations thereof will be apparent to those skilled in the art. Accordingly, it is intended that the claimed subject matter be viewed broadly. Examples are provided as reference and should not be construed as limiting. The term "such as" when used should be interpreted as "such as, but not limited to."

Figure 1:
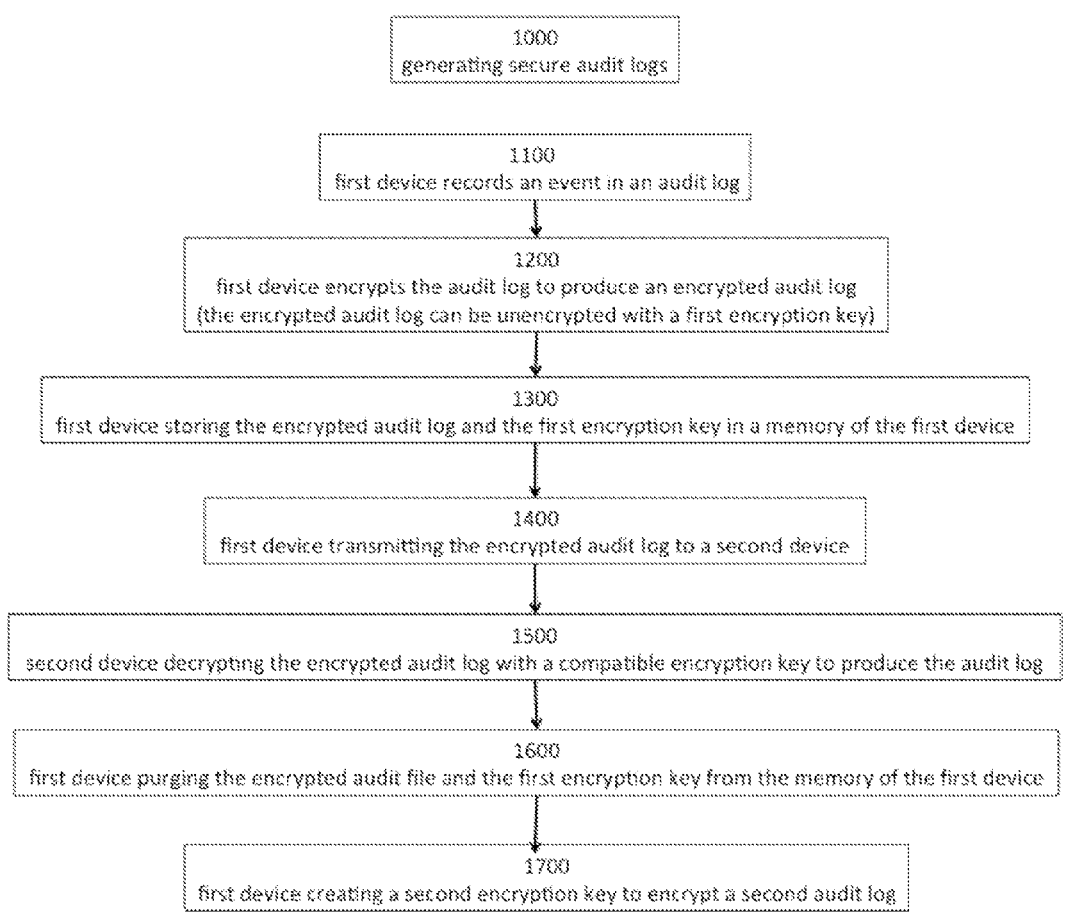
FIG. 1 is a diagram illustrating a method for generating a secure audit log in accordance with the teachings of the present invention.

FIG. 1 illustrates a method for generating secure audit logs 1000 comprising a first device that records an event in an audit log (see step 1100). An audit log is composed of entries. The first entry in the log is a key entry. Subsequent entries are log entries. The key entry has the information necessary for a secure audit server to decrypt the log entries. The first device encrypts the audit log to produce an encrypted audit log (see step 1200), wherein the encrypted audit log can be unencrypted with a first encryption key. Next the first device stores the first encryption key in a memory of the first device (see step 1300).

Next the first device transmits the encrypted audit log to a second device (see step 1400). Alternatively the first device may store a set of encrypted audit logs and transmit them to the second device at a later time. For example, the first device may periodically send the set of encrypted audit logs to the second device for storage and processing at predetermined times, or when a particular event occurs.

Next the second device decrypts the encrypted audit log with a compatible encryption key to produce the audit log (see step 1500). The second device then uses the secured audit log to perform a forensic root cause analysis. For example, the encryption of the audit log is performed such that the chain of title for the audit log is sufficient to withstand the scrutiny of a legal proceeding.

Next, the first device purges the encrypted audit file and the first encryption key from the memory of the first device (see step 1600). Finally, the first device creates a second encryption key to encrypt a second audit log (1700). The process described in steps 1100 through 1700 may be repeated for any number of events and audit logs.

Figure 2:
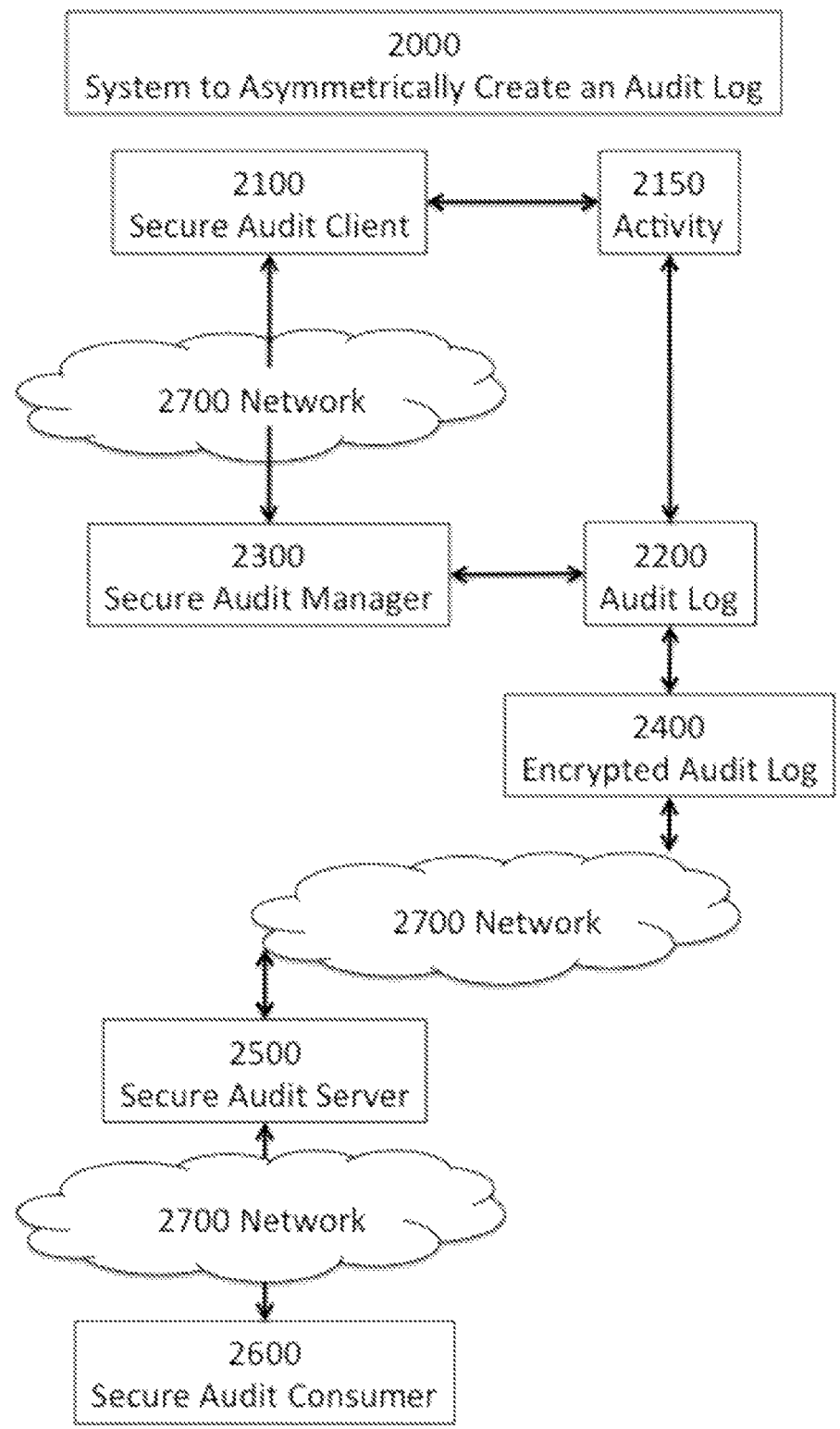
FIG. 2 is a diagram illustrating a system to asymmetrically create a secure audit log in accordance with the teachings of the present invention.

FIG. 2 illustrates another embodiment of the invention comprising a system enabled to asymmetrically encrypt audit logs 2000, store a limited period of the encrypted audit logs, periodically sending the encrypted audit logs to a central location for storage and further processing in order to provide tamper-proof evidence of activity. The system comprises a secure audit client 2100 enabled to perform various activities 2150. Next a secure audit manager 2300 is enabled to log such activities in an audit log 2200 for uploading to a secure audit server 2500. The audit log 2200 is composed of entries. The first entry in the audit log 2200 is a key entry. Subsequent entries are log entries, wherein the key entry has the information necessary for the secure audit log server to decrypt the log entries. The log may include a set of data comprising information related to the activity including a log level, a message, a time stamp, and an entry counter. The entry counter is a monotonically increasing counter. The monotonically increasing counter enables the secure audit log server to verify that all log events are accounted for in an uploaded audit log file.

The secure audit manager is further enabled to asymmetrically encrypt the audit log to produce an encrypted audit log. The secure audit manager asymmetrically encrypts the audit log; for example by using an Galois/Counter Mode (GCM) encryption scheme, as further described herein.

The secure audit manager 2300 is further enabled to upload the encrypted audit log 2200 to a secure audit server 2500. The secure audit server 2500 is enabled to receive the encrypted audit log 2400 from the secure audit manager 2300. Finally a secure audit log consumer 2600 is enabled to request the audit log 2200 from the secure audit log manager 2300 to review the secure audit log 2200.

Furthermore the secure audit client 2100 is configured to secure an authenticated communication between the secure audit client 2100, the secure audit manager 2300, and the secure audit server 2500. Upon start up, or at periodic intervals, or upon request, the secure audit client 2100 will establish a secure and authenticated communication link with the secure audit manager 2300. Furthermore the secure audit manager 2300 is enabled to establish a secure and authenticated communication link with the secure audit server 2500 and the secure audit server 2500 is enabled to establish a communication link with the secure audit consumer 2600. The secure and authenticated communication links may be established using standard cryptographic techniques over a network 2700. The network may be either a wired or wireless communication network. The network may include a public or private network such as the internet, intranet, telecommunications system, secure messaging service, or other network capable of transmitting electronic data.

The secure audit client 2100, secure audit manager 2300, secure audit server 2500, and secure audit consumer 2600 may include internal hardware such as a processor, memory, and communication features. The secure audit client 2100, secure audit manager 2300, secure audit server 2500, and secure audit consumer 2600 may include software applications enabled to encrypt and decrypt data before sending the data through the network. The data encryption may be accomplished using any data encryption method such as Advanced Encryption Standard ("AES").

The secure audit client 2100, secure audit manager 2300, secure audit server 2500, and secure audit consumer 2600 may include smart phones, tablet PC's, notebook PC's, desktop PC's, remote monitoring devices, cameras, or sensors. Such devices may be used for any type of communication, computing, or electronic operation. Furthermore, such devices may comprise a physical storage device such as a hard drive, series of hard drives, SSD memory, SD Card, or any other type of local volatile or volatile memory. The secure audit server 2500 may also be a remote cloud storage service, such as Amazon Storage, Google Cloud Storage, or any other commercially available remote network storage service. The invention is also applicable to both mobile devices and fixed devices since either type are commonly used to transmit data to and from other mobile and fixed devices via a network.

Figure 3:
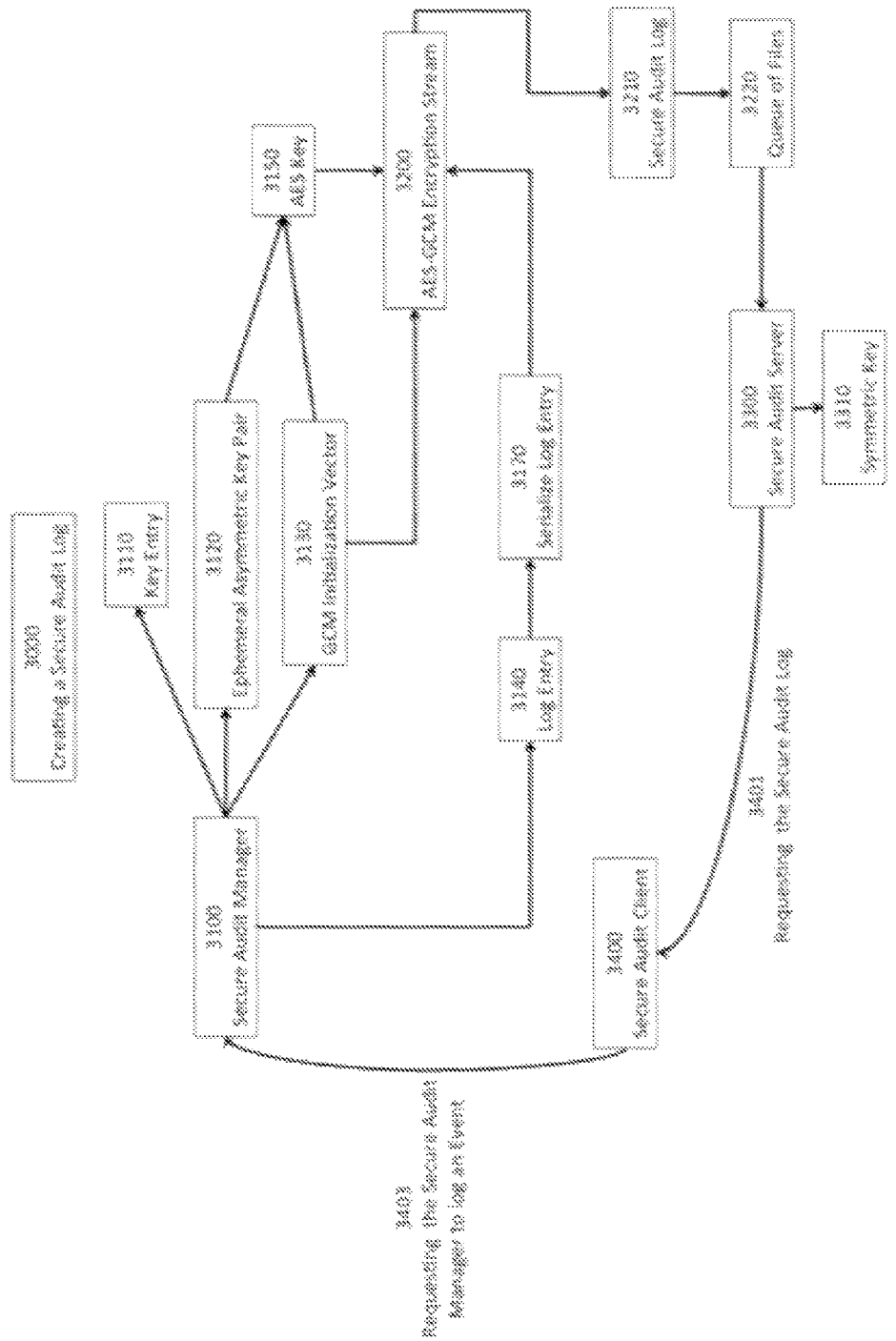
FIG. 3 is a diagram of an exemplary embodiment for a process to create secure audit logs in accordance with the teachings of the present invention.

As illustrated in FIG. 3, another embodiment of the invention comprises a process 3000 for creating a secure audit log. First a key entry 3110 is created, wherein the key entry includes the information necessary for a secure audit log server to encrypt the secure audit logs. A secure audit log manager 3100 generates an ephemeral asymmetric key pair 3120 and a GCM initialization vector 3130. Next, the ephemeral asymmetric key pair 3120 is used to execute an elliptic curve Diffie-Hellman key agreement between the ephemeral asymmetric key pair 3120 and a public key of the secure audit log manager 3100 to produce a symmetric AES key 3150. Next the symmetric AES key 3150 is used with the GCM initialization vector 3130 to establish an AES GCM encryption stream 3200 for encrypting a log entry. Next, a secure audit client 3400 requests to log an event 3403 and the secure audit log manager 3100 creates a log entry 3140, wherein the log entry 3140 comprises a log level, a message, a time stamp, and an entry counter. Next the secure audit log manager 3100 serializes the log entry 3170 and passes it through the AES GCM encryption stream 3200 and puts the encrypted entry into a secure audit log 3210.

Next, the secure audit log manager 3100 terminates the secure audit log when a predetermined event has occurred. For example, the secure audit log manger 3100 will terminate the secure audit log 3210 when the secure audit log 3210 reaches a configured maximum size, or when the secure audit log 3210 reaches a configured time period, or when a secure audit client 3400 requests an upload. Next the secure audit log manager 3100 sanitizes the symmetric AES key 3150 and the ephemeral asymmetric key pair 3120 before new keys are generated. Next the secure audit log manager 3100 adds the secure audit log 3210 to a queue of files 3220 to be uploaded to the secure audit log server 3300.

The secure audit log manager 3100 uploads the queue of files 3220 to the secure audit log server 3300 when a precondition occurs. For example, the secure audit log manager 3100 uploads the queue of files 3220 when a permanent private key of the secure audit log manager 3100 is unlocked, or when the secure audit log manager 3100 has access to a network connection. The secure audit log 3210 remain persisted in the secure audit log manager 3100 until the secure audit log 3210 is successfully uploaded to the secure audit log server 3300. The secure audit log 3210 is uploaded to the secure audit log server 3300 via an authenticated message addressed to the secure audit log server 3300, wherein the authenticated message includes the secure audit log, a creation date of the secure audit log, and an identifier for the secure audit log manager 3100. A permanent private key of the secure audit log manager 3100 is used to sign the entire contents of the authenticated message to assure authenticity of the secure audit log 3210. Since the contents of the secure audit log 3210 are already encrypted, only the signature is required for authentication and no further encryption is required. Next the secure audit log server 3300 receives the authenticated message, validates the signature, and accesses the secure audit log 3210.

Next a secure audit log client 3400 requests the secure audit log 3210 wherein the secure audit log server 3300 processes the key entry for the secure audit log 3210. The secure audit log client 3400 can request the contents of a specific secure audit log 3210 for a chosen secure audit log manager 3200 instance. For example, the secure audit log server 3300 is able to process the key entry 3110 for a selected secure audit log 3210. Next the secure audit log server 3300 validates the signature of the key entry. Next the secure audit log server 3300 generates an agreed upon symmetric key 3310 by performing the elliptic curve Diffie-Hellman key agreement between the ephemeral public audit log key and the permanent private key of the secure audit log server 3300. Next the secure audit log server 3300 initializes the AES GCM encrypted stream with the GCM initialization vector from the key entry and a derived symmetric key. Next the secure audit log server 3300 decrypts and deserializes the key entry before presenting to the secure audit log client. Next, the secure audit log manager will sanitize the symmetric key and the ephemeral asymmetric key pair after terminating the secure audit log. Next the secure audit log manager creates a new secure audit log and a new key entry.

Throughout this description the secure audit client, secure audit manager, secure audit server, and secure audit consumer have been described as devices, however software components can also be used to perform the actions of any of such devices. Furthermore, the cryptographic components enabled to perform encryption and decryption may rely on asymmetric cryptography. For example, AES-GCM encryption has been described, but other methods may be used such as ECDH for key agreements, use of shared secrets, hard coded passwords, and one-time pads.

Throughout this description, references were made to devices coupled together. Such coupling includes a manner that allows the exchange and interaction of data, such that the operations and processes described may be carried out. For example, the devices may be coupled with electrical circuitry, or through wireless networks that allow the devices to transfer data, receive power, execute the operations described, and provide structural integrity. Reference was also made to interactions between a device and a server via a network, however the invention is scalable to be enabled with more devices and servers than described in the specification. For example, any number of devices, networks, and servers, may be utilized to enable this invention.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed:

1. A method for generating a secure audit log comprising:
a first device recording, signing, encrypting, and locally storing an event in an audit log following the event, wherein a first entry of the secure audit log is an encryption key and any subsequent entries of the audit log are event logs;
wherein the audit log includes a monotonically increasing entry counter enabling a second device to verify that all of the event logs are accounted for in an uploaded audit log file;
the first device encrypting the audit log to produce an encrypted audit log, wherein the encrypted audit log can be unencrypted with a first encryption key;
the first device storing the first encryption key in a memory of the first device;
the first device, while in an unauthenticated state, transmitting the encrypted audit log to the second device via a network;
the second device decrypting the encrypted audit log with a compatible encryption key to produce the audit log, wherein the second device uses the secure audit log to perform a forensic root cause analysis;
the first device purging the encrypted audit log and the first encryption key from the memory of the first device; and
the first device creating a second encryption key to encrypt a second audit log, wherein encrypting the audit log protects a chain of title for the audit log.

2. The method of claim 1, wherein the first device stores a set of encrypted audit logs.

3. The method of claim 2, wherein the first device periodically sends the set of encrypted audit logs to the second device for storage and processing.

4. A method for creating and securely transmitting event logs comprising:
a secure audit log manager generating an asymmetric key pair and a Galois/Counter Mode (GCM) initialization vector to produce a symmetric Advanced Encryption Standard (AES) key;
the secure audit log manager using the symmetric AES key with the GCM initialization vector to establish an AES-GCM encryption stream for encrypting an audit log;
a client requesting the secure audit log manager to log, sign, encrypt, and locally store an event in an event log following the event;
the secure audit log manager creating an audit log, wherein a first entry of the audit log is an encryption key and any subsequent entries of the audit log are event logs;
wherein the audit log includes a monotonically increasing entry counter enabling the secure audit manager to verify that all of the event logs are accounted for;
the secure audit log manager serializing the event logs and passing the audit log through the AES-GCM encryption stream to create the secure audit log;
the secure audit log manager terminating the AES-GCM encryption stream to terminate the secure audit log;
the secure audit log manager adding the secure audit log to a queue of files for uploading to a secure audit log server via a network;
the secure audit log manger uploading the queue of files via the network to the secure audit log server via an authenticated message addressed to the secure audit log server, wherein a permanent private key of the secure audit log manager is used to sign the authenticated message to assure authenticity of the secure audit log;
the secure audit log server receiving the authenticated message via the network, validating the signature, and accessing the secure audit log;
the secure audit log server decrypting the secure audit log to yield the event logs;
the secure audit log server deserializing the event logs; and
the secure audit log server sending the event logs via the network to the client while the client is in an unauthenticated state.

5. The method of claim 4 wherein, the key entry includes information necessary for the secure audit log to be decrypted.

6. The method of claim 4 wherein the ephemeral asymmetric key pair is used to execute an elliptic curve Diffie- Hellman key agreement between the asymmetric key pair and a public key of the secure audit log manager to produce the symmetric AES key.

7. The method of claim 4 wherein the log entry comprises a log level, a message, a time stamp, and an entry counter.

8. The method of claim 4 wherein the secure audit log manager terminates the secure audit log when the secure audit log reaches a maximum size, or when the secure audit log reaches a configured time period, or when the client requests an upload.

9. The method of claim 4 wherein the secure audit log manager uploads the queue of files when a permanent private key of the secure audit log manager is unlocked, or when the secure audit log manager has access to a network connection.

10. The method of claim 4 wherein the signature is required for authentication and no further encryption is required.

11. The method of claim 4 wherein the secure audit log server generates the symmetric key by performing an elliptic curve Diffie-Hellman key agreement between the public audit log key and the permanent private key of the secure audit log server.

12. The method of claim 4 wherein the secure audit log manager sanitizes the symmetric key and the asymmetric key pair after terminating the secure audit log.

13. The method of claim 4 wherein the authenticated message includes the secure audit log, a creation date of the secure audit log, and an identifier for the secure audit log manager.

14. The method of claim 4, wherein the secure audit log manager creates a new secure audit log and a new key entry after the secure audit log is sent to the secure log manager.

* * * * *